May 10, 1955 J. K. HOSKINS 2,708,074
PROCESS FOR DISPOSAL OF CONTAMINATED HOSPITAL WASTE
Filed Dec. 3, 1952 2 Sheets-Sheet 1

FIG. I.

INVENTOR.
JOHN K. HOSKINS
BY
Ben. J. Gronny
his ATTORNEY

INVENTOR
JOHN K. HOSKINS

2,708,074
PROCESS FOR DISPOSAL OF CONTAMINATED HOSPITAL WASTE

John K. Hoskins, Chevy Chase, Md., assignor to Hospital Sanitation Equipment Corporation, Washington, D. C., a corporation of Delaware Application December 3, 1952, Serial No. 323,871

3 Claims. (Cl. 241—17)

This invention relates to a method for sterilizing and disposing of contaminated hospital waste in general.

More particularly this invention relates to the absolute sterilization and comminuted disposal into a sewerage system of a hospital of all forms of waste contaminated with virulent bacteria, and other forms of obnoxious waste, closely adjacent to the points of origin of such waste. Such treatment and disposal is essential in accomplishing the reduction to a minimum of cases of infection of persons who handle such waste or are exposed to it.

The methods used for the protection of patients and others in hospitals from infections due to the handling of and exposure to relatively clean materials such as surgical instruments, bandages, dressings, bedding, etc., have been improved to the point that they provide all possible safety. The methods used in the accumulation of infectious waste prior to disposal, in the handling and transporting of the containers of such waste, and in the disposal of the waste itself have, however, undergone little improvement and are unbelievably antiquated, filthy and hazardous.

The types of contaminated hospital waste contemplated for treatment under this invention include but are not limited to, waxed paper cups or tissues into which tuberculosis patients expectorate, the paper bags or other containers used in collecting such articles from the patients, paper milk containers and drinking straws used by tuberculosis patients or those with other contagious diseases, food scraps left by such patients, operating room waste such as body tissues which have been removed from patients, and materials used during surgical operations, such as dressings, bandages, swabs, etc. as well as waste resulting from autopsies, including body tissues.

The waste disposal method and system of this invention is employed in conjunction with a vertically positioned autoclave sealed at the top with a standard autoclave door having projecting and retracting radial bolts and having at the bottom a three-inch automatically operated plug valve on the discharge pipe connected with the sewerage system of a hospital building. In the operation of this method and system, after contaminated waste has been placed in the autoclave hopper, the door is closed and bolted manually. The push button of the system is then pressed to energize the electrically operated automatic system controlling the subsequent phases of operation. This subsequent operation is subject to the closing of a safety cover switch which is accomplished by the end of one of the projecting bolts of the autoclave cover closing this switch when the cover is securely bolted.

The subsequent phases of the method of this invention may be controlled by a series of timers which are associated with solenoid valves on the water and steam supply pipes connected to the autoclave and cause these valves to open, to admit steam at sterilizing temperature, by means of a steam pipe connection at the bottom. Simultaneously, water is admitted to the hopper through connections at the bottom, top and mid-point. These operations and subsequent ones can occur only if steam at sterilizing pressure is available. Otherwise, a pressure switch on the steam pipe functions to de-energize the control system. This safeguard also operates if during the sterilizing period the steam pressure drops below the sterilization point.

After predetermined time intervals for admitting an established volume of water, for raising the temperature of the water suitably for complete sterilization and for exhausting air from the upper portion of the hopper, a solenoid valve on the water pipe connection is closed. Soon thereafter, another solenoid valve on a vent pipe connection is closed, thereby sealing the hopper during a time interval determined as suitable for complete sterilization of the hopper contents.

The presence of a substantial volume of water in the hopper is required for the purpose of unfolding the containers for contaminated waste, such as, waxed paper, for softening the paper after the wax coating has been removed by the heat. The rate of flow of the water through the discharge valve, when it is opened, also controls the feeding of the unfolded and softened paper to the macerator.

The turbulence of the water in the hopper during the boiling period unfolds and softens the paper. Without the water, the containers are very difficult to reduce to small particles because there is a tendency for the upper paper cups to arch over the macerator. Furthermore, without the water the paper cups are hardened by dry steam and the resistance imposed on the macerator by the folded corners of a multiplicity of such containers, which are fed into the macerator or cutter at the same time, is so great as to stall an electric motor having a reasonable power rating. This condition has, by actual experience, twisted the one and three-eighths inch diameter steel shaft on which the macerator cutters were mounted.

Without the water in the hopper, portions of the hard, unfolded containers are inclined to jam in the macerator; whereas with the water, the unfolded, partially softened paper floats and is fed uniformly into the macerator as the water flows through it on its way to the valve opening below. Under the latter circumstance, the maceration is readily and easily accomplished.

After the lapse of time determined as suitable for complete sterilization (during which the steam valve has remained open), the steam valve is closed and the solenoid valve on the vent line is again opened to release the pressure from the hopper. After the lapse of time determined as necessary to release all pressure, another solenoid valve is opened permitting the water to flow through the hydromotor which functions to open the discharge valve to the sewer. If this valve does not actually open, a limit switch on it prevents subsequent operation of the control system and the unit.

When the discharge valve has ben completely opened, the macerator motor is energized and the solenoid valve on the water supply pipe is opened to permit the flow of water for washing the inside of the hopper and to supply a water jet over the macerator to agitate any of the contents of the hopper which might otherwise tend to arch over the macerator or cutter. During this phase of the operation, the floating, unfolded, and partly softened paper is fed into the macerator or cutter and the valve below. The speed at which the paper is fed into the macerator or cutter is retarded by the rate at which the water flows through the discharge valve and the burden on the macerator or cutter is thereby lightened so that the waste is reduced to small particles suitable for discharge into the sewerage system.

After the time determined as suitable for reducing the waste to small particles has elapsed, the flow of water is stopped and the switch in the electric circuit for the motor is opened, thereby stopping the motor. At this stage of operation, a timer functions to energize the discharge valve control to close this valve and also functions to de-energize the relay which held the electric control circuit active during the complete operating cycle. The control system is thereby de-energized and the autoclave door may then be opened, ready for the next operation.

Alternate methods for reducing the contaminated waste to small particles may be employed, such as, for example agitating the water in the vessel by mechanical beaters or agitators or by the introduction into the water of chemicals adapted to weaken the fiber structure of the waste and these may be placed in the hopper at the same time as the water. In connection with such alternate methods, the macerator may be eliminated.

Referring now to the drawing briefly:

Figure 1:
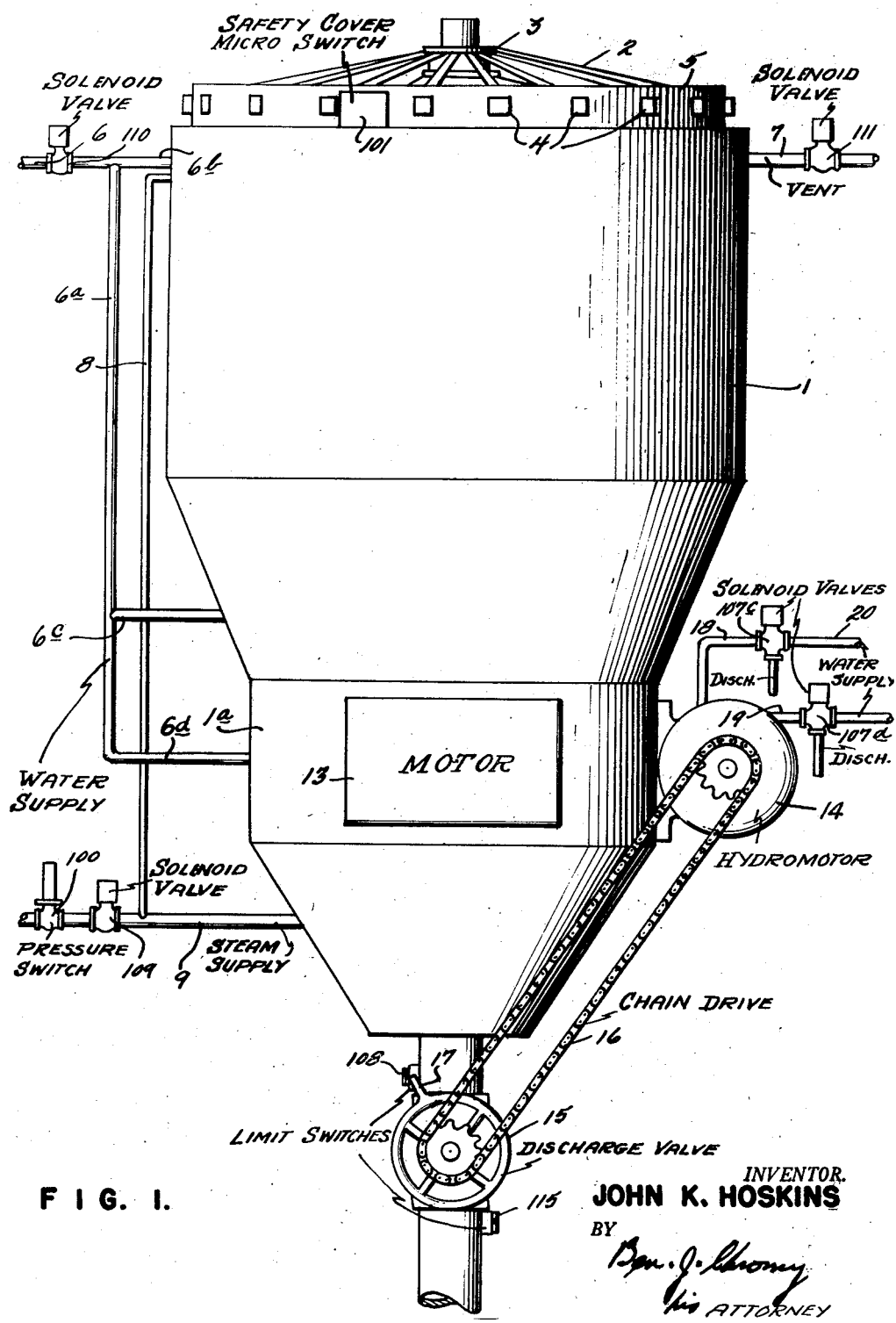
Fig. 1 is a schematic showing of an embodiment of this invention.

Referring to Fig. 1 of the drawing in detail, there is illustrated in diagrammatic manner an embodiment of the sterilization and disposal unit adapted to function in accordance with this invention. This unit comprises an autoclave 1 having a cover 2 that is provided with a plurality of locking bars 3 adapted to have the ends thereof inserted into the holes 4 of the flange 5 that is attached to the top of the autoclave.

Water is supplied to the autoclave by the supply line 6 which is connected to the water pipe 6a through the water valve 110 and this pipe 6a is connected to the machine by three pipes, 6b, 6c and 6d. The pipe 6b is connected to the top portion of the autoclave; the pipe 6c is connected to the lower portion of the autoclave just above the motor driven macerator or cutter 1a which may be the same or similar to that illustrated in copending application Serial No. 268,496, filed January 28, 1952, and assigned to the assignee of the present application. The pipe 6d is connected to supply water to the macerator or cutter 1a. The pipe 7 which comprises the vent is also connected to the top of the autoclave and the opening and closing of this vent is controlled by the solenoid operated valve 111. A steam line 8 is also connected to the top of the autoclave chamber. Steam is supplied to the machine by the pipe 9 that is connected to the unit below the macerator or cutter 1a. The pipes 8 and 9 are connected to the steam supply line through the solenoid controlled valve 109 and a steam pressure actuated switch 100 is also connected to this steam supply line.

The solenoid controlled valves 109, 110 and 111 may be of the type of electrically operated valves manufactured and sold by the Aktomatic Valve Co., of Indianapolis, Indiana.

A suitable electric motor 13 is attached to the side of the unit and is coupled to the macerator or cutter for the purpose of driving the cutters thereof. Also attached to the unit is a hydromotor 14 that is coupled to the discharge valve 15 by means of a chain 16. The discharge valve 15 is connected between the bottom of the casing of the unit and the sewerage line. This valve is also provided with a rotatable element 17 that is employed for closing the limit switches 108 and 115.

The hydromotor is provided with two input water supply line connections 18 and 19 for the purpose of rotating this motor either in a clockwise or counter-clockwise direction, depending on which connection is used to feed water thereto. A 3-way solenoid valve 107c is employed for connecting the water pipe connection 18 to the water supply line 20 to control the rotation of the hydromotor 14 in the clockwise direction, and the solenoid valve 107d is employed for connecting the water pipe connection 19 to the water supply line 20 to control the rotation of the hydromotor 14 in the counter-clockwise direction.

The cover switch 101, which may be of micro-switch type, is mounted on the flange 5 and is adapted to be closed by the end of one of the locking bars 3 when this locking bar is projected through the corresponding hole 4 to engage the actuating member of this switch.

Figure 2:
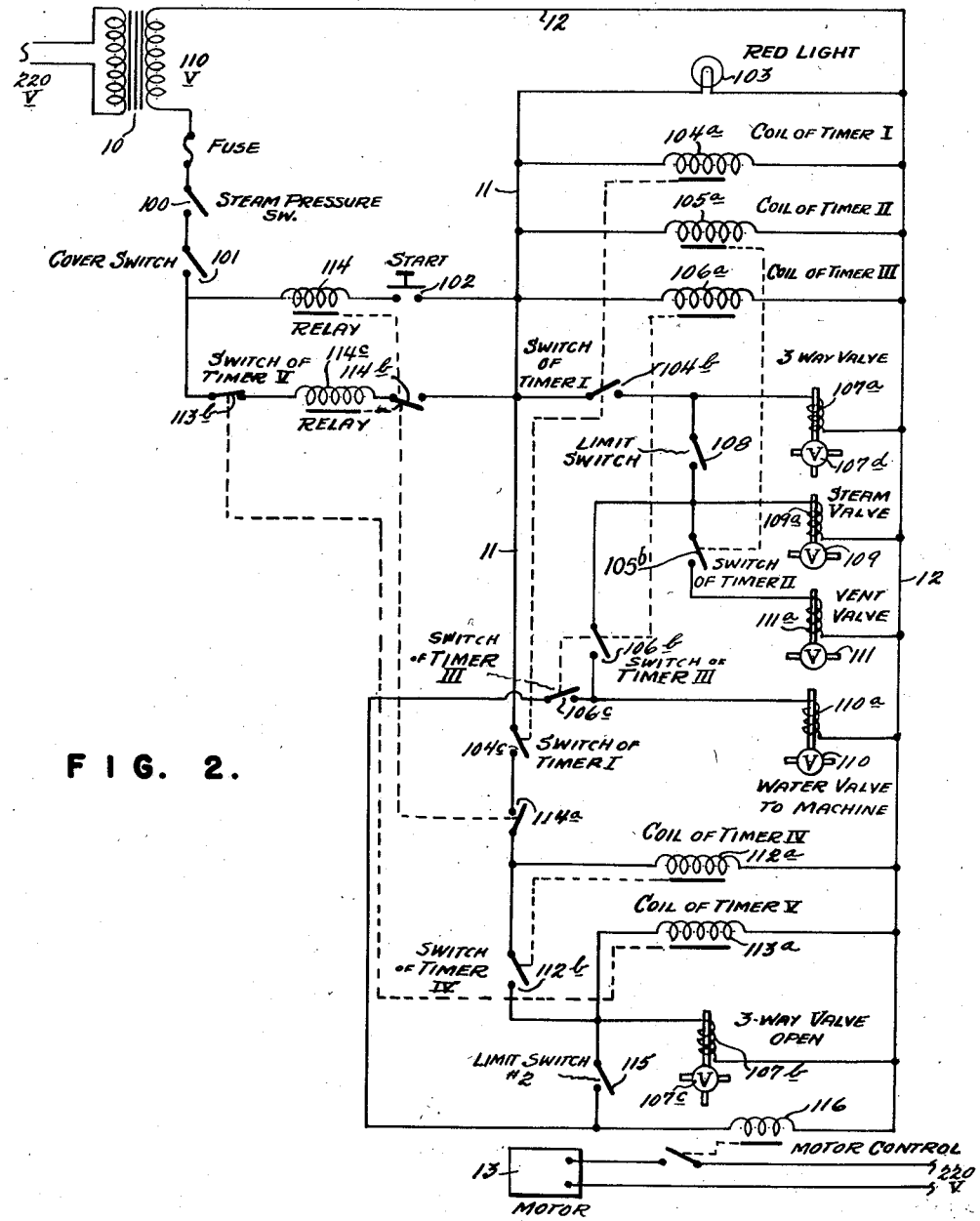
Fig. 2 is a view illustrating the various details of the automatic control system of this invention.

In Fig. 2 there is illustrated a wiring diagram of the electric control pertaining to this invention. A transformer 10 is employed for connecting the circuit to the 220-volt electric power supply for the purpose of stepping down the voltage of the supply from 220-volts to 115-volts. The secondary of this transformer 10 is connected to one terminal of the steam pressure actuated switch 100 that is actuated by the steam pressure in the steam line, shown in Fig. 1 and this switch is closed by the steam pressure when this pressure is of a predetermined value. The other terminal of the switch 100 is connected to one side of the switch 101 that is controlled by the autoclave cover lock, as shown in Fig. 1, and this switch is closed when the autoclave cover is closed and locked. The cover lock control switch 101 is connected to the winding of the hold-in relay 114 and to the momentary contact push button switch 102 which, in turn, is connected to the bus bar 11. The switch 101 is also connected to one of the contacts 113b of the timer V and the other contact of the switch 113b is connected to the winding 114c which in turn is connected to one of the contacts 114b. The other of the contacts 114b is connected to the bus bar 11. The contacts 114b are closed by the hold-in relay 114 and held closed by the winding 114c.

The other side of the secondary of the transformer 10 is connected to the bus bar 12 which is the common line connected to one side of the pilot light 103, the coil 104a of timer I, the coil 105a of the timer II, the coil 106a of the timer III, the solenoid 107a of the 3-way valve 107d, the solenoid 109a of the steam valve 109, the solenoid 111a of the vent valve 111, the solenoid 110a of the water valve 110, the coil 112a of the timer IV, the coil 113a of the timer V, the solenoid 107b of the 3-way valve 107c, and the solenoid 116 of the motor control.

The other terminals of the pilot light 103, the coil 104a, the coil 105a and the coil 106a are connected to the bus bar 11. This bus bar is also connected to one of the contacts 104b of the timer I. The other of these contacts 104b is connected to one of the contacts 108 of the limit switch 1 and also to the other side of the solenoid 107a. The other of the contacts 108 is connected to one of the contacts 105b of the timer II and the other of the contacts 105b is connected to the other side of the solenoid 111a.

The bus bar 11 extends down to the contacts 104c of the timer I and is connected to one of these contacts. The other of these contacts 104c is connected to one of the contacts 114a of the hold-in relay 114 and the other of the contacts 114a is connected to the other side of the coil 112a of the timer IV and to one of the contacts 112b of timer IV. The other of the contacts 112b is connected to the other side of the coil 113a of the timer V and to the other side of the solenoid 107b of the other 3-way valve 107c and, also, to one of the contacts 115 of limit switch 2. The other of the contacts 115 is connected to the other side of the motor control relay 116 and to one of the contacts 106c of the timer III. The other of the contacts 106c is connected to the other side of the water valve solenoid 110a and to one of the contacts 106b of timer III. The other of the contacts 106b is connected to the other side of the solenoid 109a of the steam valve 109.

In order that the pressing of the starting button 102 may energize the electric sequence control system, the steam pressure switch 100 must be closed by the presence of pressure in the steam supply pipe suitable for complete sterilization and the safety cover switch 101 must be closed by the secure bolting of the autoclave door. When those switches are closed and the starting button 102 is pressed, the red pilot light 103 glows and the system, including the electric coils 104a, 105a and 106a of timer I, timer II and timer III is energized. Then, in proper order, the various timer switches are operated by their individual timing devices to perform the following functions.

The closing of the switch 104b of timer I functions to energize the solenoid valve 107a of the 3-way valve in the water line to the hydromotor 14, thereby closing the discharge valve 15. However, this valve 15 may be closed at the end of the cycle of operation instead of at the beginning. The closing of the discharge valve operates a limit switch 108, which permits the operation of the subsequent phases, the first of which is the opening of the steam valve 109, mentioned in the foregoing description. With opening of the steam valve 109 by the energization of the solenoid 109a, the contacts of the switch 106b on the timer III function to energize the solenoid 110a of the valve 110 on the water supply pipe which is thus opened for a limited time.

After predetermined time intervals for admitting an established volume of water, for raising the temperature of the water suitably for complete or absolute sterilization and for exhausting air from the upper portion of the hopper, the solenoid valve 110 on the water pipe is closed. Soon thereafter, another solenoid valve 111 on the vent pipe connection is closed, thereby sealing the hopper 1 during a time interval determined as suitable for complete sterilization of its contents. The presence of a substantial volume of water in the hopper 1 is required for the purposes of unfolding the containers for contaminated waste such as waxed paper, for softening the paper after the wax coating has been removed by the heat. The rate of flow of the water through the discharge valve 15 when it has opened, as will be described hereinafter, also controls the feed of the unfolded and softened paper to the macerator. Without the water, the turbulence of which during the boiling period unfolds and softens the paper, the containers are very difficult to macerate.

The contacts 106c of timer III are closed to connect the water valve solenoid 110a to the same circuit as the motor control 116, after the contacts 106b are opened by the timer III. At the end of its time cycle, the switch 105b of timer II is closed to energize the solenoid 111a of the vent valve 111, thereby closing the vent pipe as described above. At the end of its time cycle, timer I, by its contacts 104b, closes the circuit to the electric coil 112a of timer IV, which then allows the proper time for the venting cycle to release the pressure in the vessel. The open contacts 112b of timer IV are then closed, thereby energizing the coil 113a of timer V and also connecting the solenoid 107b to operate the solenoid valve 107c on a second water line to operate the hydromotor 14 to open the discharge valve 15. The opening of the discharge valve operates the limit switch 115 which closes the circuit to operate the electric motor control 116 for the macerator, and activates the second contact 106c on timer III to open solenoid valve 110, thereby permitting the flow of water to wash the insides of the hopper 1.

The normally closed switch 113b of timer V, through the relay 114c, holds the electric circuit active until this switch 113b is disconnected by the timer V at the end of its operating cycle. Timer V, at the end of its time cycle, opens the switch 113b and releases the relay 114c which de-energizes the control system. At this time the solenoid valve 110 on the water pipe is closed and the macerator motor is stopped.

Various modifications falling within the spirit and scope of this invention may be made, for example, means other than maceration may be employed for disintegrating the sterilized waste and in that case the macerator controls may be transferred, both as to time in the cycle of operation and the length of operation thereof, to the operation of this other means. And, it is, therefore, desired that the invention not be limited to the exact details as described and illustrated except insofar as those details are defined by the claims.

What I claim is:

1. The process of disposing of contaminated hospital waste comprising the steps of wetting and steaming the waste to soften paper containers therein, further steaming and boiling the contaminated waste at a temperature and pressure for absolute sterilization to decontaminate the same, cutting, shredding and macerating the sterilized waste to form a flowable slurry-like stream of disintegrated material and discharging the same for sanitary disposal.

2. The process of disposing of contaminated hospital waste comprising the steps of confining the waste in a chamber, wetting and steaming the waste to soften paper containers therein, reducing the volume of air in said chamber during the first portion of the wetting and steaming of said waste and containers, further steaming and boiling the contaminated waste at a temperature and pressure for absolute sterilization to decontaminate the same, cutting, shredding and macerating the sterilized waste to form a flowable slurry-like stream of disintegrated material and discharging the same for sanitary disposal.

3. The process of disposing of contaminated hospital waste comprising the steps of confining the waste in a chamber, filling the space in the chamber between said waste and containers with water and steam thereby driving the air out of the chamber and wetting and steaming the waste to soften paper containers therein, further steaming and boiling the contaminated waste at a temperature and pressure for absolute sterilization to decontaminate the same, cutting, shredding and macerating the sterilized waste to form a flowable slurry-like stream of disintegrated material and discharging the same for sanitary disposal.

References Cited in the file of this patent

UNITED STATES PATENTS

| Number | Name | Date |
| --- | --- | --- |
| 32,879 | Lambert | July 23, 1861 |
| 99,735 | Wilder | Feb. 8, 1870 |
| 565,669 | Clark | Aug. 11, 1896 |
| 1,030,169 | Emery | June 18, 1912 |
| 1,294,163 | Puttaert et al. | Feb. 11, 1919 |
| 1,327,590 | Burby | Jan. 6, 1920 |
| 2,086,338 | Sodergreen | July 6, 1937 |
| 2,394,273 | Thomas | Feb. 5, 1946 |
| 2,517,833 | Bourland | Aug. 8, 1950 |

OTHER REFERENCES

"Disinfection and Disinfectants," by M. J. Rosenau, published by P. Blakiston & Sons Co., Philadelphia, Pa. (1902), pp. 228 and 229. Copy in Div. 43 of the Patent Office.